June 17, 1947. T. BARTHOLOMEW 2,422,464
METHOD AND APPARATUS FOR SEPARATING LIQUID FROM
SOLIDS BY ROTATABLY MOUNTED MEANS
Filed Sept. 1, 1942 2 Sheets-Sheet 1
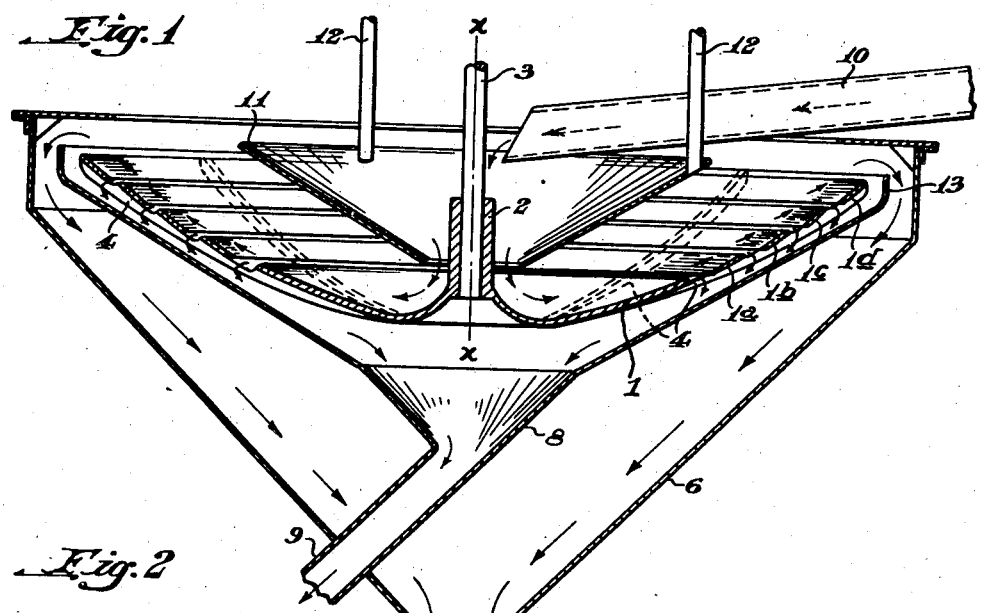
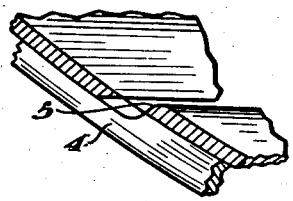
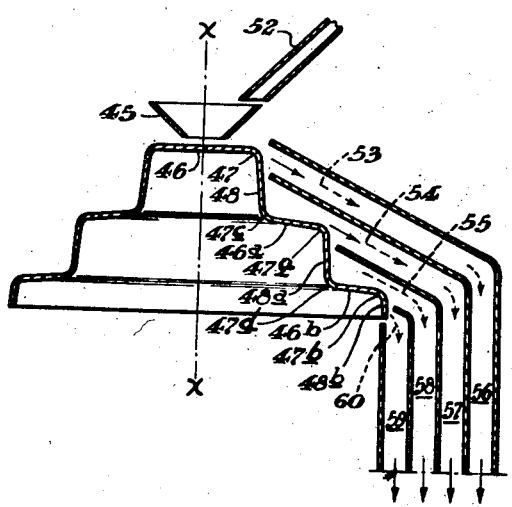
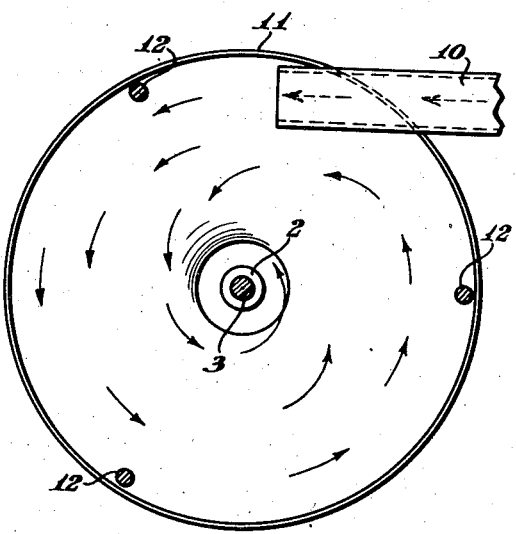
INVENTOR.
Tracy Bartholomew
BY Brown, Critchlow & Flick
his ATTORNEYS.

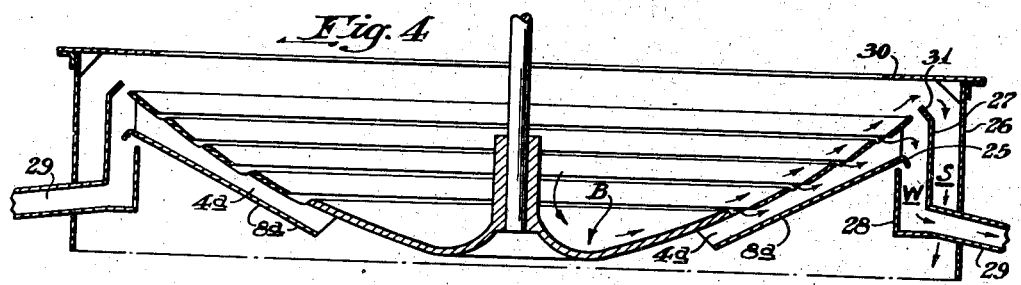
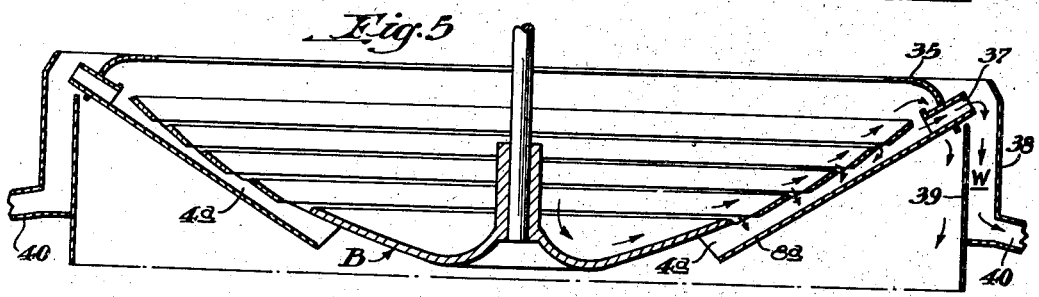
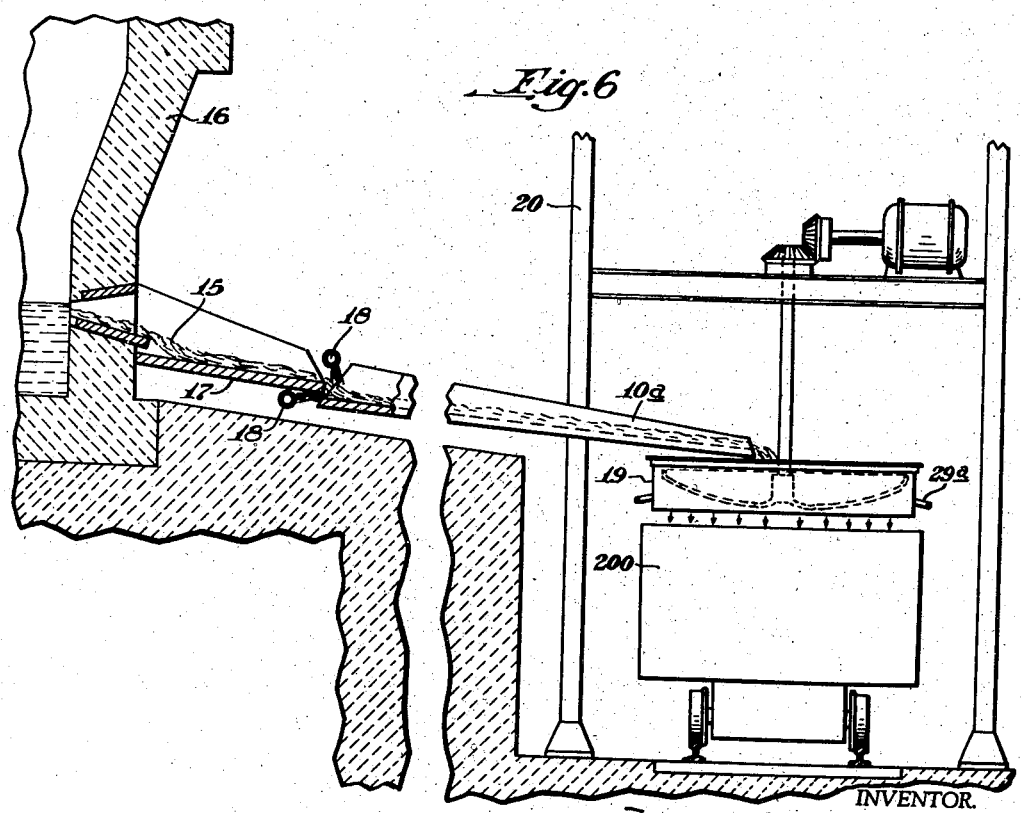

Patented June 17, 1947

2,422,464

UNITED STATES PATENT OFFICE 2,422,464

METHOD AND APPARATUS FOR SEPARATING LIQUID FROM SOLIDS BY ROTATABLY MOUNTED MEANS

Tracy Bartholomew, Pittsburgh, Pa.

Application September 1, 1942, Serial No. 456,907

13 Claims. (Cl. 210—1)

This invention relates to the separation of a mixture of solids and liquid and it includes more particularly the quick dewatering of water-treated molten slag.

A primary object of the invention is to provide a method of separating liquid from solids which is rapid, efficient and economical, does not require extensive or expensive apparatus, is adapted to continuous operation, and is applicable to the production of a commercially dry solid product if desired.

A particular object is to improve the process and apparatus disclosed in my U. S. Patent No. 2,210,-999, dated August 13, 1940, to render them of greater utility.

Yet another object is to provide a new and useful process and apparatus for general use for the dewatering of other solids, such as coal, ores, sand, gravel, and the like.

Yet another object is to effect continuous separation of liquids from solids in an efficient and economical manner through the use of centrifugal force.

Still another object is to provide apparatus for separating solids from liquids in the practice of the method provided by the invention and which is sturdy, simple, can be built to occupy relatively little head room, and which is operable with a minimum of labor and power.

A special object is to provide a method of and an apparatus for producing commercially dry granulated slag in a more facile, economical and efficient manner than heretofore.

A further object is to provide a method embodying the foregoing characteristics and which is applicable to the separation of liquids from solids coupled with the differential separation, or classification, of the solids themselves.

Other objects of the invention will appear from the following specification.

The invention will be described with particular reference to the accompanying drawings in which Fig. 1 is a vertical sectional view of apparatus embodying and operable in accordance with the principles of the invention adapted particularly to dewatering operations; Fig. 2 a detail on an enlarged scale of a portion of the separating element of Fig. 1; Fig. 3 a plan view of the feeding means of Fig. 1; Figs. 4 and 5 views similar to Fig. 1 showing modified embodiments; Fig. 6 a fragmentary vertical and somewhat schematic view showing the application of the apparatus of Fig. 1 to the dewatering of blast furnace slag; and Fig. 7 an elevational view, partly in section, of a separating element in accordance with the invention which is especially adapted to the differential separation of solids.

In my above-mentioned patent there is disclosed a method for removing surplus water from hot, freshly quenched slag particles which comprises flowing the mixture by gravity over a series of inclined surfaces which are stepped and spaced apart from each other in the direction of flow. The liquid clings to the surfaces by interfacial tension and is thereby diverted and separated from the hot slag, which has no tendency to cling to said surfaces nor even to the liquid itself, from which it is separated by a surface film of vapor produced by the high temperature of the slag particle. As a result the water flows away from the slag granules in one direction and the granules are discharged in a different direction and in a substantially dry form from the last surface.

Many thousands of tons of dry granulate of unsurpassed quality have been made and economically dewatered by the simple stationary apparatus of that invention. But the size of the apparatus and the space required for its installation have militated against its extensive use commercially. Such an apparatus adequate to treat the molten slag as produced at the blast furnace—at a rate of about 60 to 200 tons per hour of hot slag plus an even larger quantity of water—requires more ground space, and particularly more vertical fall, than is available adjoining already congested blast furnaces. And the expense of transporting the molten slag to another site, keeping a crew of men there for necessarily intermittent operation, and maintaining the heavy transportation equipment, including disposal of slag skulls, is almost prohibitory.

A primary purpose of the present invention is to condense the separatory or dewatering apparatus so that the slag can be commercially treated at the furnace even in the large tonnages as made, and within the space, and particularly within the vertical fall or head room, there available; and thus to save the almost prohibitory expense incident to non-contiguous operation.

I have succeeded in making a very substantial reduction in apparatus size, and particularly in the all important matter of vertical fall, by using centrifugal force instead of gravity to move the material under treatment. And I have discovered, and it is upon this that the invention is in part predicated, that the improved apparatus has several advantageous features which were not previously evident even to one skilled in the art.

By the use of centrifugal force acting to throw the material horizontally, no vertical fall whatever is needed to move the material. The vertical fall needed for the separation can be reduced, in comparison with the apparatus of my aforementioned patent, by 60 per cent to 90 per cent or more. If necessary, I can even discharge both solids and liquid at a higher elevation than received.

As applied in the present invention I can control the centrifugal force to move, or flow, the material as rapidly as desired across the separation surfaces, thereby increasing the quantity treated (capacity) per unit area, and can control the thickness of the layer of material undergoing treatment, thereby increasing efficiency.

Further, I find that under the stronger centrifugal force, as applied in this invention, the solids rebound energetically from the separating surfaces, and, in comparison with my prior inventions, the liquid flows more smoothly, splashes less, and clings more closely to said surfaces, thereby facilitating and improving the separation.

Moreover, the faster, smoother flow permits a material reduction in the width of the separating surfaces, and also of the spaces beneath them, with resultant further reduction in size of apparatus and space requirement for a given capacity.

In the gravity apparatus of my aforementioned patent the lamina of liquid most closely clinging to the surfaces was actually the slowest moving part of the stream, approaching, in fact, the immobility of the stationary surfaces themselves. But the speed of separation (capacity) depends upon the quantity of this clinging film which flows over those surfaces. In the practice of the present invention, in which the motivating force acts through those surfaces, it is the closely clinging lamina that moves fastest, as is desirable, and this faster movement is surprisingly more effective.

By using a series of separation surfaces, each of which removes a film of the liquid, I can, by my present mode of using centrifugal force, advantageously continue the treatment even after all continuous liquid film has been removed. The constantly increasing centrifugal force then acts directly upon the solid particles alone, causing them to roll and spin rapidly, thereby mechanically dislodging residual surface moisture even from cold, thoroughly wetted particles, said moisture being caught on the separating surfaces and discharged separate from the solids.

Experience with the present invention has shown that its usefulness is not confined to the separation of liquids from solid particles which are not wet by said liquid, whether by reason of high temperature which causes a vapor film to surround the particle or otherwise. The centrifugal principle as used in this invention gives an excellent separation even when the solid particles are cold and are wet by the liquid. Its economic usefulness is not limited to hot slag, but covers a broad field including such products as coal, sand, ores, gravel, etc.

Although not limited thereto, as will appear, the invention is applicable with advantage to the dewatering of blast furnace slag, for which reason it will be described with particular reference thereto, by way of illustration but not of limitation. In such case the material to be treated comprises a mixture of water (liquid) and slag granules (solid particles).

I have discovered, and it is upon this that the invention is in large part predicated, that slag can be dewatered in accordance with the objects of the invention by moving the mixture of water and slag granules, suitably in the form of a relatively thin layer, or film, over a surface which is wet by water, whereby the tendency of water to cling to that surface is greater than is that of the solid slag particles, and this differential clinging tendency is enhanced and converted to a practical means of separating the slag granules from the water by subjecting the moving layer, or film, to mechanically created forces, most suitably centrifugal action, which become progressively greater in the direction of travel of the mixture. In this manner the desired separation is effected easily and efficiently. By providing the surface with a portion curved away from the general path of the mixture over the surface the forces so applied tend to divert a constituent of the mixture from a rectilinear, or inertial, path so that the constituents are caused to move along different paths and thus to be separated. Such curved portions of the surface are for brevity sometimes referred to hereinafter as changes in curvature of the surface.

In the practice of the invention the separation is effected most suitably by providing the surface on which the mixture moves with a change in curvature, as indicated above. The interfacial tension between the liquid and the surface causes the liquid to cling to and follow the change in curvature, but there is no tendency for the slag granules to cling; the result is that the water is diverted from the path along which the granules move, and separation is effected.

Preferably, for the best results, the surface is provided with a series of changes in curvature, as will appear more in detail hereinafter. This may be provided by a series of spaced curved surfaces or by a stepped surface having successive changes of curvature.

Most suitably this is accompanied by a series of interrupted, or spaced, surfaces whose outer edges, in the direction of travel, change curvature,, as by a series of concentric spaced ring members whose outer edges are curved downwardly or convexly and which are preferably arranged to form a bowl-like member.

When the forces are properly applied, as by rotation of an appropriate surface, the tendency is for both the slag granules and the water to be thrown by inertia tangentially from the surface. However, by properly correlating the speed of rotation to the rate of feed and to the characteristics of the liquid, the solid and the change of curvature of the surface, the tendency of the liquid to cling to the surface over which it is moving will be sufficiently great to cause a film of the liquid to follow the contour of the surface and thus to be separated from the solid particles so that at least part of the liquid will be ejected from the surface along a different path from that taken by the solid. That is, interfacial tension will cause at least part of the liquid, water in this case, to cling to the surface and thus to follow the change in curvature, while the lack of clinging tendency of the solid particles, slag granules in this case, will cause them to follow their normal path. In this manner a practical separation is effected, and the two constituents of the feed, or either of them, may be collected separately.

In the practice of the preferred embodiment, in which the mixture moves over a series of concentric surfaces, or plates, the outer edges of which provide a change of curvature, water is diverted adjacent the edge of each plate, and commercially dry slag is ejected from the outermost plate of the series.

As will be understood from what has been said, and as will appear hereinafter, the apparatus provided by the invention comprises a movable surface, most suitably rotatable, which is wet by water and which is provided with a change in curvature, means for moving the said surface, means for supplying a mixture of solid particles and liquid, in this case blast furnace slag and water, to the surface, and means for collecting one or both of the constituents of the mixture. The surface may be any of the types described hereinabove.

For a more detailed description of the invention reference will now be made to the accompanying drawings.

Figs. 1 to 3 are representative of an apparatus which is particularly adapted to dewatering of blast furnace slag and which operates in accordance with the principles described. It comprises a series of concentric ring members 1, 1a, 1b, 1c, 1d disposed to form a bowl-like member about a central hub 2 for receiving a shaft 3, driven by any suitable means, not shown, so that the bowl may be rotated about a vertical axis x—x. The ring members 1 to 1d are cast integrally with the hub and a series of radially extending spaced ribs 4. As appears more clearly from Fig. 2, the ring members are spaced from one another, adjacent their outer edges, or peripheries, they are curved downwardly at 5, and they are arranged so that the surface of each successive member is substantially in line with the bottom of the preceding member. The arrangement is such, however, that as a whole a bowl-like assembly is formed.

Surrounding the structure just described is a stationary casing 6 which is provided with an offtake conduit 7 at its lower end for gravity discharge of material which is collected thereby. Mounted within casing 6 is a second casing 8 arranged to collect separately all of the material which is discharged from the edge or periphery of ring members 1 to 1d. This casing is provided with a discharge conduit 9.

A mixture of slag and water is fed by a trough 10 into a cone feeder 11 which delivers it to the bowl. Feeder 11 may be supported in fixed position by rods 12 from a support, not shown, and most suitably trough 10 is disposed to deliver the mixture tangentially, as seen in Fig. 3, whereby rotary motion, indicated by the arrows, Fig. 3, is imparted to the mixture prior to entering the bowl-like separating member.

In the use of the apparatus shown in Figs. 1 to 3 the mixture of slag and water upon reaching the bowl is thrown outwardly over the surfaces 1 to 1d by centrifugal force. The slag will move, or slide, freely over the surfaces, but under the interfacial tension between the liquid and the surface, a part of the water, the quantity of which will depend largely upon the shape of the surface, its nature, and the speed of rotation, will follow the curvature 5 of plate 1 and be thus deflected downwardly to be discharged into casing 8 from which it flows into conduit 9. The remainder of the mixture is moved under centrifugal force to plate 1a, where another film of water is diverted by curvature 5, to pass also to casing 8, and the remainder of the slag-water mixture is passed to surface 1b. This partial separation is repeated upon the succeeding surfaces, all in accordance with the principles described above, until finally the solid matter which reaches surface 1d has been freed from water to the desired extent. It is expelled outwardly from surface 1d and is collected in casing 6 for withdrawal through conduit 7. Casing 8 is provided with an upwardly extending baffle member 13 which acts primarily to catch water diverted from surface 1d, and also to prevent solid material from rebounding from casing 6 into casing 8.

Fig. 4 shows a modification of the apparatus of Fig. 1 which is particularly advantageous where available head room is limited, as the considerable head room otherwise needed for casings 6 and 8 of Fig. 1 is saved. This comprises, as shown, a rotatable bowl B constructed as described in connection with Figs. 1 and 2 except that a water collecting member 8a in the form of an inverted frustum of a cone is connected to the underside of ribs 4a, to rotate with the bowl. Member 8a may, if desired, be made integral with the ribs.

In this modification water diverted by the edge curvature of the concentric surfaces, or plates, is discharged in the direction of the arrows to collector 8a and caused to move upwardly thereover and be discharged by centrifugal action. At its outer end collector 8a is provided with a splash back apron 25. Surrounding the bowl are three parallel walls 26, 27 and 28 mounted in fixed position to provide spaces W and S. Water ejected from collector 8a enters space W and is discharged therefrom by a plurality of conduits 29 arranged around the periphery. Dewatered slag is ejected from the outermost of the concentric plates into space S and falls downwardly into a railway car, storage bin, or other like device. Inasmuch as the slag granules are ejected at considerable velocity, it is desirable to provide means for guiding them into space S. To this end a top plate 30 is connected to side plate 26 to extend inwardly over the outermost of the concentric plates, and the upper end 31 of side plate 27 is formed in an inwardly extending direction as shown to prevent granules from rebounding into space W and also to turn any water from the outermost concentric surface down into space W.

Fig. 5 is illustrative of a modification of the apparatus shown in Fig. 4. It comprises the bowl B, made up of concentrically disposed plates connected my spaced ribs 4a as described above, and a collecting member 8a mounted as in Fig. 4 to rotate with the bowl. In this modification, however, the dewatered slag is ejected against a rotating plate 35 which deflects the slag and causes it to fall downwardly, between spaced conduits 37, within the casing formed by wall 39 into a railway car, for example as indicated in Fig. 6, while the outer end of collector 8a extends beyond the concentric separating plates and to the extended portion there is connected a conduit 37 which serves also to support plate 35. The water which moves upwardly over plate 8a enters conduit 37 and is ejected from its outer edge into a space W formed between stationary side walls 38 and 39 at the lower ends of which a series of discharge pipes 40 are disposed peripherally.

The slag-water mixture is desirably fed to the apparatus of Figs. 4 and 5 in the manner described in connection with Figs. 1 to 3.

It will be understood that various other modifications are within the scope of this invention. For instance, to increase the capacity, and thus to obtain very large capacity even with limited head and side room, two or more bowls such as shown in Figs. 1, 4, and 5 may be mounted over one another on a common drive shaft. In such case the bowls above the bottom bowl are slotted adjacent their hubs for feeding the liquid-solid mixture to the various bowls.

Fig. 6 illustrates the application of the apparatus of Figs. 1 to 5 to a typical blast furnace. A stream of molten slag 15 from a blast furnace 16 flows over a trough 17 and is met by one or more jets of water 18 which break it up into discrete particles, or granules. The water and granules are collected in a trough 10a which feeds the mixture into a separator such as that shown in Figs. 1 to 5; but suitably of the type of Fig. 4 or Fig. 5, indicated generally by the numeral 19, which is supported under a stack 20. The separated granulate is discharged into an underlying railway car 200, while the separated water from the water discharge 29a is passed to waste or recycled to jets 18. The considerable amount of steam which is liberated from the water-granulate mixture is carried off by the stack.

In this operation the application of centrifugal force causes the separation to take place at a high rate, preferably almost instantly. Hence even though a great excess of cold water be used to insure excellent granulation, the solidified granules may be separated and discharged before much of their heat has been dissipated and while the interior of the particles yet contains more than enough sensible heat to evaporate completely any residual moisture so that a substantially dry product is assured. Even if the slag is to be discarded, treatment in this manner is less costly than the cheapest method of disposal now in commercial use, and the excessive cost of transporting useless water is eliminated. The invention is especially adaptable to slag treatment, however, where the granulate is to be used for making pozzuolan-Portland, masonry, slag-lime, or Portland cement by the dry process, especially because of elimination of the costs encountered in drying wet granulate. The apparatus can be accommodated at any blast furnace, needs no pit or crane, has high output capacity and uses a minimum of power while requiring a minimum of labor and upkeep. Moreover, the desired separation can be effected, as will be appreciated, with apparatus of relatively short vertical height, as compared with that required by the invention of my above-mentioned patent. In fact, it is possible to do so satisfactorily within the vertical falls already available at existing blast furnaces.

Likewise, from what has been said it will be apprehended that the invention is not restricted to dewatering of slag but is applicable generally to the separation of liquids and solids for any desired purpose. For instance, such purposes may be to provide dewatered or dried coal, ore, gravel, or other solid, or to recover a valuable liquid. The invention is not restricted to such ends, however, but is of general applicability; for example, it may be used in place of many well-known processes in the benefication of ores and other materials, or in classification of solid particulate matter, e. g., to classify as to particle size or to classify matters of varying composition.

It will be noted from the foregoing description that I separte liquid from solids (as in dewatering) by using centrifugal force to eject the solids all together while withdrawing successive fractions of liquid through spaces between the treatment surfaces. Thereby I can in a more direct and effective manner than heretofore effect separation of solids from liquid. However, through this invention I can even effect separation among solids (carried by liquids) which differ in at least one characteristic such, for example, as composition, particle size or shape, surface character, or specific gravity. For this purpose it is desirable to move the mixture of liquid and solid particles under centrifugal force over a series of stepped surfaces which are wet by the liquid and between which there are changes of curvature. More in detail, I use exactly the principle explained above, but conversely, to separate solids from solids, i. e., I use centrifugal force to eject successive fractions of solids along the resulting inertial path while withdrawing the liquid all together at a different place. For this separation only changes in curvature, rather than spaces between treatment surfaces, are required.

Fig. 7 is a somewhat schematic representation of an apparatus operable in accordance with the foregoing principles to effect differential separation of solids from each other and from a liquid which carries them. It includes a stepped separatory member, rotatable about axis $x$—$x$, which extends generally outwardly and downwardly, comprising a series of nearly horizontal feeding aprons 46, 46a, 46b leading to changes in curvature or lips 47, 47a, 47b and connected by more steeply inclined skirts 48 and 48a and terminating in skirt 48b, all of which are made of a material which the liquid wets and to which it tends to cling.

The member is rotated at a proper speed and the liquid-solid mixture is fed from conduit 52 in a uniform layer or film by feeder 45, of type shown in Fig. 3, onto apron 46 from which it tends to flow over the entire series of surfaces and to overflow from the last skirt 48b. Rotation of the member, and therefore revolution of the mixture, sets up centrifugal force of constantly increasing intensity within the mixture as it moves outwardly, which force tends to throw both liquid and solids tangentially away from the member.

In the case of the liquid, this force is fully counteracted by the clinging of the liquid to the rotating surface which it wets so that substantially all of the liquid continues to cling to the whole series of surfaces until finally discharged from the last skirt 48b. The revolving solid particles, however, have no tendency whatsoever to cling to the rotating surfaces and are thrown off tangentially by the centrifugal force in their resulting inertial paths.

The ejection of the solid particles is resisted by the liquid film which, partly by enclosing and partly by wetting them, tends to carry them along with it. However, as the mixture moves outwardly, flows faster and in a thinner film, this force rapidly diminishes whereas the centrifugal force constantly increases. The result is that the individual solid particles eventually overcome the resistance of the liquid and are discharged tangentially by centrifugal force at various points, depending upon their individual characteristics, and a differential separation of the solid particles is thereby effected. Substantially all discharge of solids is from the lips, particles of one character being discharged from lip 47, of another at lip 47a, and of a third at 47b. Material from lip 47 follows inertial path 53 into passage 56, that from lip 47a follows inertial path 54 into passage 57, and that from lip 47b path 55 into passage 58, while the water flows off skirt 48b along path 60 into passage 59.

The exact position and angle of the surfaces and paths referred to are dependent upon such factors as the size, shape, specific gravity, porosity, smoothness or roughness of the particles, the wettability of the particles by the liquid, the presence of froth, the temperature, the surface character of the skirt, the speed of rotation and radius of the skirt, and the like. However, for most purposes it is desirable that the curvature of lips 47, 47a and 47b be made successively sharper, thereby to secure sharper separations as the liquid layer moves farther over the surface. For some purposes I have found it satisfactory to incline skirts 48, 48a and 48b to the vertical at a slope of about 1 to 5, and to similarly slope aprons 46, 46a and 46b to the horizontal, and to have the skirts and aprons laid out so that a cone passed through the several lips intersects the axis of rotation at an angle of 45° or more.

As evidencing the intensity of the interfacial or clinging force involved, it may be noted that even if the rotating member shown in Fig. 7 be mounted bottom side up, liquid fed to the lower side of apron 46 may be made to flow up the outside of the surfaces, where it is held against centrifugal force only by the clinging force, and be discharged from skirt 48b as before.

In a workable modification for the separation of finely divided particles, the member may be used in the position shown in Fig. 7, modifying it only to permit feeding of the liquid-solid mixture to the under side of surfaces 46 or 48. Upon rotation of the member, the mixture will move over the inner surfaces of the several aprons, lips and skirts, and the constituents will be separated at the two internal lips 47c and 47d formed between walls 48 and 46a, and 48a and 46b, respectively substantially as already described for motion over the outside. In this modification, gravity acts with rather than against the ejecting force.

It will be understood from the foregoing description that the term "surface" as used herein refers to that face of a movably mounted member which the mixture of liquid and solid particles contacts and which the liquid wets; and the term "change of curvature" refers broadly to a change of direction of the said surface in a convex direction and so disposed that liquid which tends to cling to the surface by interfacial or surface tension is thereby drawn away from the path of material which does not so tend to cling. Thus, in the embodiments of Figs. 1, 4 and 5 the surfaces of the concentric plates present a generally smooth curved, or bowl-like, contour, while their downwardly, or convexly, curved outer edges provide a change of curvature, forming a lip on the surfaces. In the embodiment of Fig. 7 the intermediate lips are convexly curved and function as changes of contour just as in the foregoing embodiments.

To summarize, I separate liquid from solid matter by making use of the tendency of a liquid to cling to a surface which it wets. The liquid-solids mixture is moved by centrifugal force over such a surface to a change in curvature or lip at which under the influence of the forces at work a separation of the constituents of the mixture is effected. The liquid is held on and follows the curved surface of the lip, but solids of certain characteristics break away from the liquid and follow their inertial path to a suitable passage leading to a storage receptacle.

Stated otherwise, in separating liquids from solids the controlling factor is the force acting between the surface and the liquid, i. e., the balance is between the clinging of the liquid to the treatment surface and the centrifugal force. But in separating solid from solid in a liquid it is the tendency of the liquid to hold the solid which prevents the solid particle from being ejected from the liquid too soon, and the balance of forces in this case is between the clinging of the liquid to the solid particle and the centrifugal force. When the latter predominates, the particle is no longer held by the liquid, and follows its inertial path away from the rotating surface at one of the lips.

As will be understood from what has been said above, the apparatus may be modified in various ways, the invention being not restricted to the precise details represented by the drawings. Thus the proportioning, disposition and size of the relative parts may be altered according to the particular operation to be carried out. For example, the changes of curvature, or lips, at the edges of the surfaces to which the mixture of liquid and solids is supplied may be extended downwardly to form skirts, for example as indicated in Fig. 7. Also, referring to Figs. 1, 4 and 5, irrespective of the differences in radii of the several plates and their curvatures, and therefore irrespective of the strengths of the centrifugal forces acting at different points, the thicknesses of the adherent films can be varied according to need, as by designing the surfaces and their curvatures at suitable angles with respect to the axis of rotation.

Generally speaking, metallic surfaces, preferably non-rusting, will be used in the practice of the invention, although it is possible to use any material which is wet by the liquid, and in the case of some liquids it might be desirable to use even such surface materials as glass, plastics, or other non-metallic organic or inorganic materials.

According to the provisions of the patent statutes I have explained the principle and method of practicing my invention and have illustrated and described what I now consider to represent its best embodiment. However, I desire to have it understood that, within the scope of the appended claims, the invention may be practiced otherwise than as specifically illustrated and described.

I claim:

1. That method of separating liquid and solids which comprises supplying a mixture of solid particles and liquid to a rotatable series of outwardly extending surfaces that are wet by said liquid, rotating said surfaces to cause the mixture to flow thereover, and by the interfacial tension between the liquid and the surfaces causing one of the constituents of the mixture to be diverted adjacent at least one edge of said surfaces from the direction of travel of the mixture, and collecting separately the liquid and the solid particles substantially free from liquid.

2. That method of separating liquid and solids which comprises flowing a layer of liquid carrying solid particles under mechanically applied forces progressively outwardly over a series of spaced surfaces that are wet by the liquid and whose outer edges are curved convexly, and by the interfacial tension between the liquid and said surfaces causing the liquid to be diverted from the general path of the mixture at said edges, and collecting separately the diverted liquid and the solid particles ejected substantially free from liquid.

3. That method of dewatering water quenched slag which comprises supplying the mixture of slag and water to a surface which the water wets and which is provided with a series of stepped portions curved away from the general path of said mixture, moving said surface to cause the mixture to flow over it, diverting water from the mixture at said curved portions by means of the interfacial tension existing between the water and said surface, and discharging slag from said curved portions in a different path by inertia and collecting it separately from the diverted water.

4. That method of dewatering quenched slag which comprises supplying the mixture of slag and water to a series of co-axial spaced outwardly sloping surfaces that are wet by the water and whose outer edges are curved convexly, rotating said surfaces simultaneously in the same direction and thereby causing said mixture to flow thereover, diverting the water from the moving slag at said convexly curved edges by means of the interfacial tension therebetween, and discharging slag from the outermost of said surfaces and collecting it separately from the diverted water.

5. Apparatus for separating a mixture of liquid and solid materials comprising a rotatably mounted element formed of a series of interconnected generally conical outwardly extending imperforate members whose surfaces at their peripheries are curved away from the general path of said mixture thereover, means for rotating said element, means for feeding a mixture of liquid and solid materials to said element for movement thereover, and means for collecting and discharging liquid and for separately collecting and discharging solid material substantially free from liquid diverted at said curved portions.

6. Apparatus for separating liquid and solid materials comprising a series of imperforate generally conical members and connections supporting them and providing a series of outwardly extending surfaces for receiving and flowing a mixture of the liquid and solid materials, said members being convexly curved at their peripheries away from the general path of said mixture, means mounting said members for rotation, means for rotating said members, means for supplying said mixture to the innermost of said surfaces, and means for collecting liquid and for separately collecting solid material substantially freed from liquid diverted at said curved portions.

7. Apparatus for separating a constituent from a mixture of solid particles and a liquid, comprising a plurality of rotatably mounted generally conical members mounted symmetrically to form outwardly sloping surfaces, each such member having a convex lip portion adjacent its periphery, means to supply to the innermost member the mixture of solid particles and liquid to be separated, means to rotate said members about the common axis, and means adjacent to each of said convex portions to collect and discharge a constituent of the mixture separated from the mixture at said convex portion.

8. Apparatus for separating liquid and solids comprising a series of generally conical imperforate plate members disposed co-axially in spaced relation to form a bowl providing a series of outwardly sloping surfaces, the outer edges of said plate members being curved downwardly, means connecting said plate members, means mounting said bowl for rotation, means for rotating said bowl, means for supplying a mixture of liquid and solid particles to said bowl, means for collecting liquid diverted from said plate members at their edges by interfacial tension between the plate surfaces and the liquid, and means for collecting separately from said liquid solids ejected along a different path from said plate members.

9. Apparatus for separating liquid and solid materials comprising a series of generally conical members disposed and arranged to provide a series of spaced outwardly extending surfaces each of which, except the outermost, discharges material to the next outer member, said members being convexly curved at their peripheries away from the general path of a mixture of liquid and solids moving thereover, means mounting said members for rotation, means for rotating said members, means for supplying said mixture to the innermost of said surfaces, and means for collecting liquid and for separately collecting solids substantially freed from liquid diverted at said curved portions.

10. Apparatus for separating liquid and solids comprising a bowl member mounted for rotation and formed of a series of ring members disposed co-axially and spaced from each other to provide surfaces for receiving a mixture of liquid and solids, said members having their outer edges curved downwardly, means associated with said members connecting them in bowl form, means for rotating said bowl, means for supplying a mixture of liquid and solid particles centrally to said bowl, means for collecting liquid diverted from said surfaces at their curved edges by interfacial tension between the surfaces and the liquid, and means for collecting separately from said liquid solids ejected along a different path from said surfaces.

11. Apparatus for separating solids of one characteristic from solids of another characteristic and from liquid which carries them, comprising a rotatably mounted generally conical member having a continuous surface provided with a series of stepped convexities extending peripherally around the member and which member is wet by said liquid, means for rotating said member, means for collecting solids of different characteristics ejected freely and without accumulation from different convexities of said member, and means for collecting separately liquid ejected from the outer edge of said member.

12. Apparatus for separating solids of one character from solids of another character and from liquid which carries them comprising a rotatably mounted separating member formed of a plurality of generally horizontal and generally circular feeding apron members whose surfaces are wet by said liquid, said apron members being connected to one another by convex peripheral lips and more steeply inclined skirt members, means for rotating said separating member, means for feeding the liquid-solids mixture to the first of said apron members, and means for collecting material ejected from said lips under centrifugal force.

13. Apparatus for separating a constituent from a mixture of solid particles and a liquid comprising a series of stepped generally conical members mounted for rotation about a common axis and providing an outwardly sloping surface for receiving said mixture, said members having their peripheries shaped convexly, means for supplying to the inner part of said surface the mixture of solid particles and a liquid, means for rotating said members about said axis, and means for collecting solid constituents ejected by centrifugal force, and means for collecting liquid separated at said convex portions.

TRACY BARTHOLOMEW.

REFERENCES CITED

The following references are of record in the file of this patent:

UNITED STATES PATENTS

| Number | Name | Date |
|---|---|---|
| 1,517,509 | Hokanson | Dec. 2, 1924 |
| 2,206,721 | Fasting | July 2, 1940 |
| 2,210,999 | Bartholomew | Aug. 13, 1940 |
| 1,747,155 | Birdsall | Feb. 18, 1930 |
| 1,291,857 | Hankar | Jan. 21, 1919 |
| 1,301,544 | Crombie | Apr. 22, 1919 |
| 1,664,769 | Chance | Apr. 3, 1928 |
| 1,569,778 | Murphy | Jan. 12, 1926 |
| 1,900,394 | Cottrell | Mar. 7, 1933 |
| 1,973,607 | Bunn | Sept. 11, 1934 |
| 2,147,414 | Sharples | Feb. 14, 1939 |
| 1,473,421 | Eccleston | Nov. 6, 1923 |
| 952,653 | Trent | Mar. 22, 1910 |

FOREIGN PATENTS

| Number | Country | Date |
|---|---|---|
| 306,954 | Germany | July 26, 1918 |
| 591,398 | France | Apr. 8, 1925 |
| 221,961 | Germany | May 14, 1910 |